July 13, 1943.  J. W. GILLON ET AL  2,324,075
FLASHLIGHT SYNCHRONIZING APPARATUS
Filed Jan. 31, 1941  4 Sheets-Sheet 1
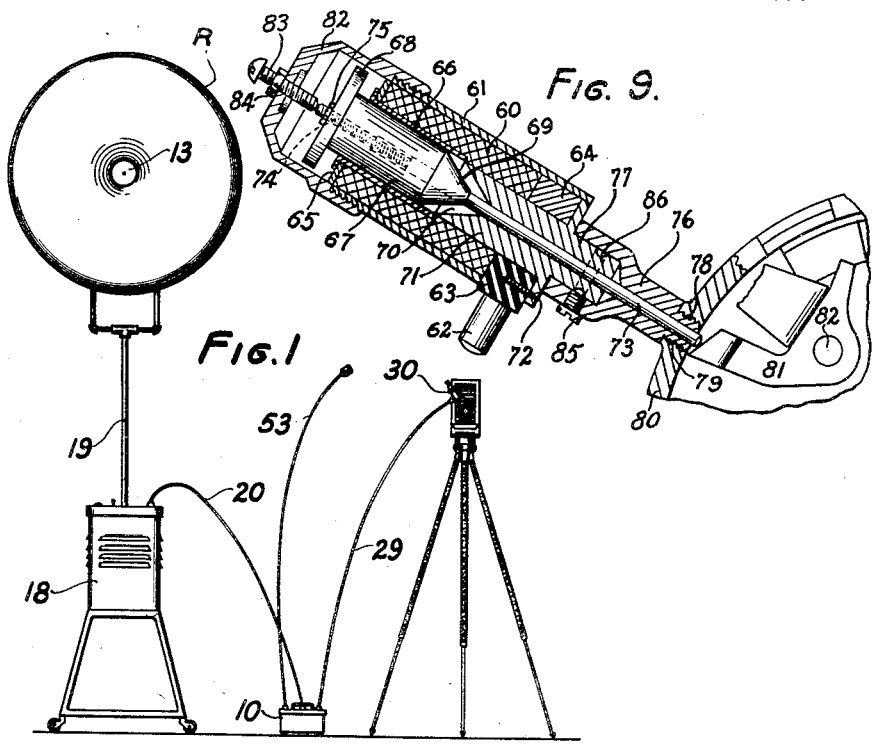
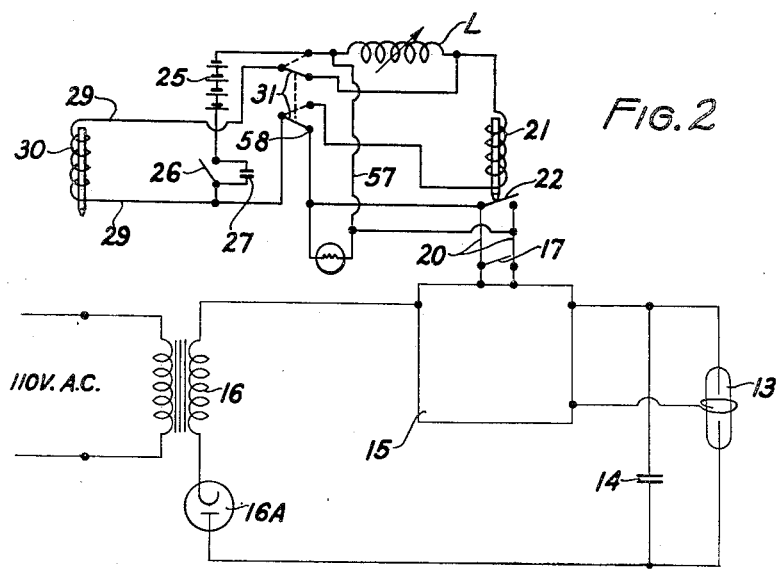
JOHN WARREN GILLON
JOHN C. HOLLISTER
INVENTORS
BY
ATTORNEYS

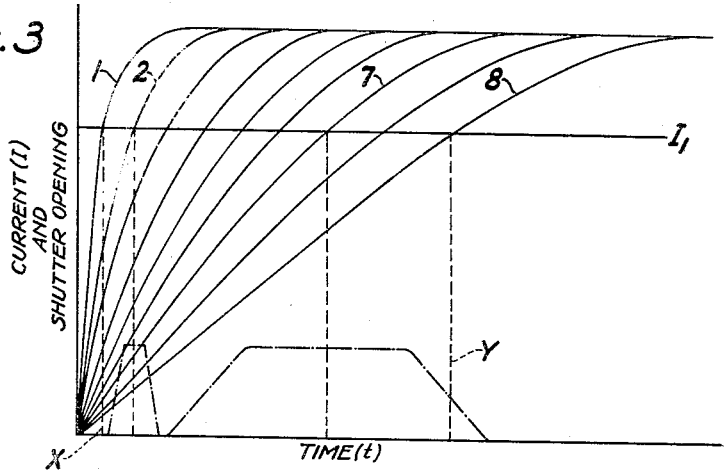
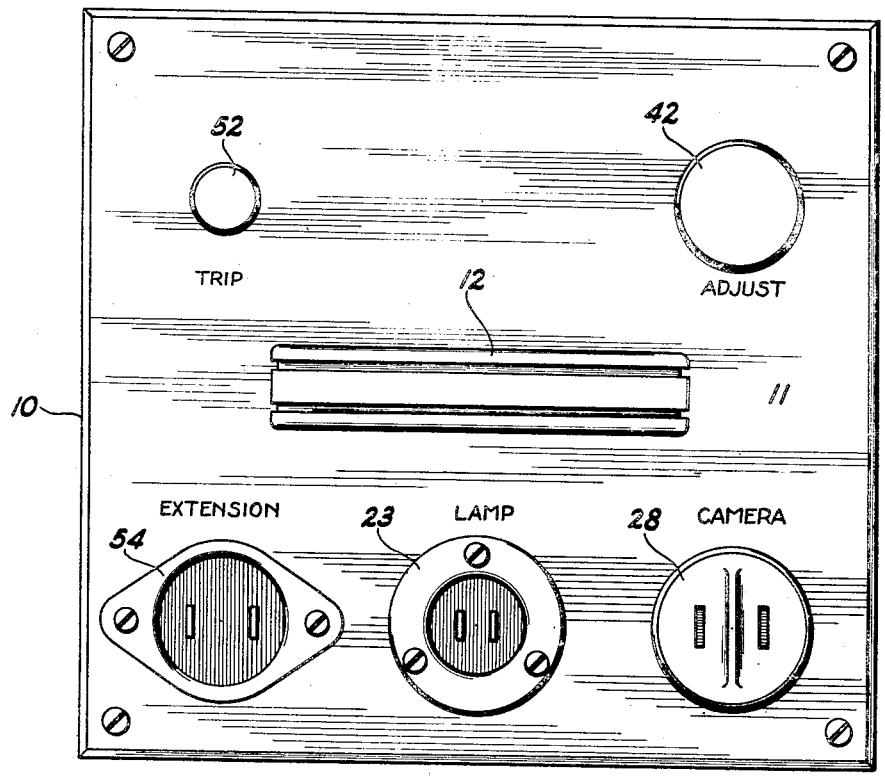

July 13, 1943.    J. W. GILLON ET AL    2,324,075
FLASHLIGHT SYNCHRONIZING APPARATUS
Filed Jan. 31, 1941    4 Sheets-Sheet 3
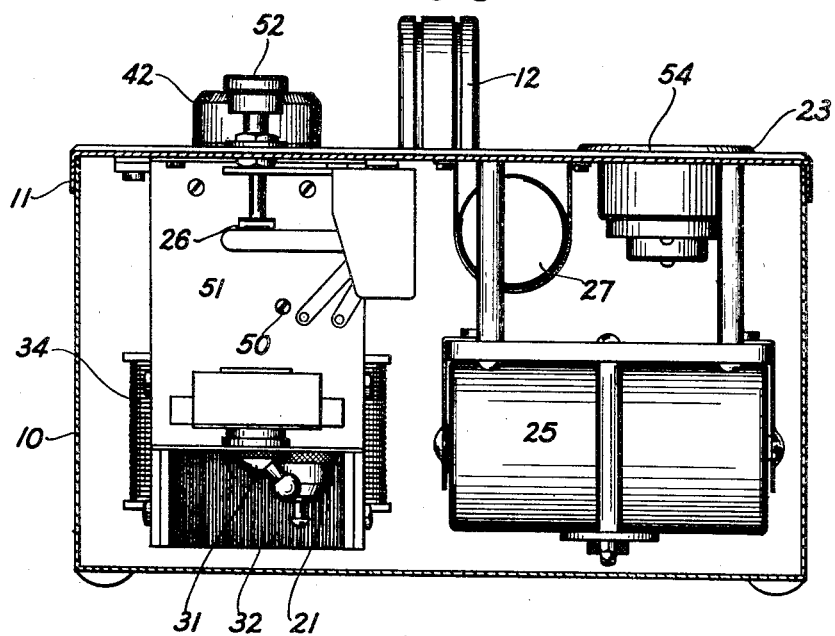
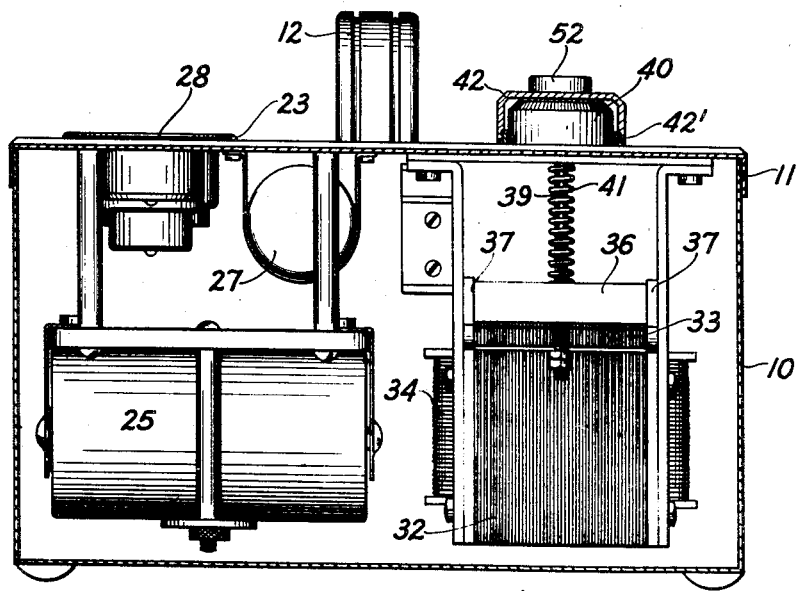
JOHN WARREN GILLON
JOHN C. HOLLISTER
INVENTORS
BY
ATTORNEYS

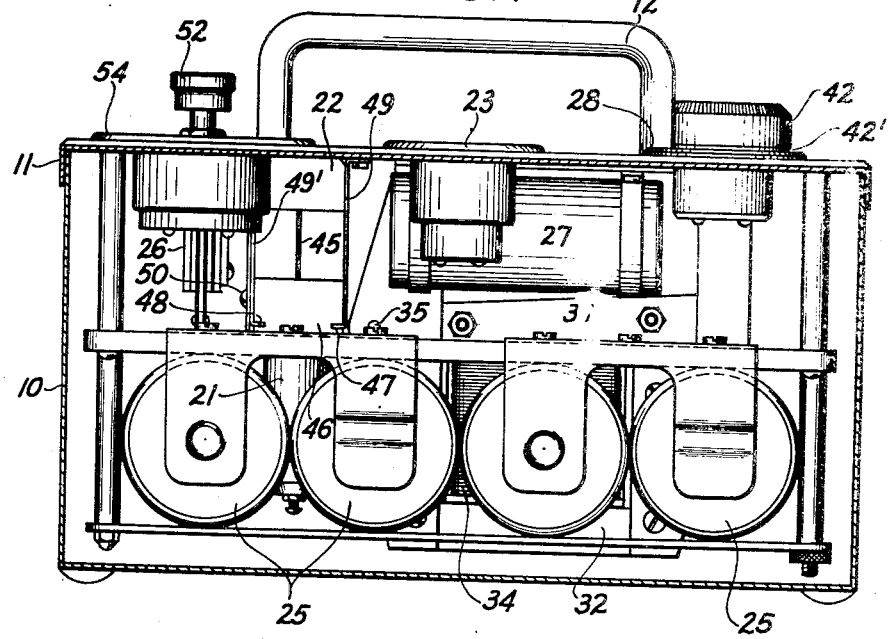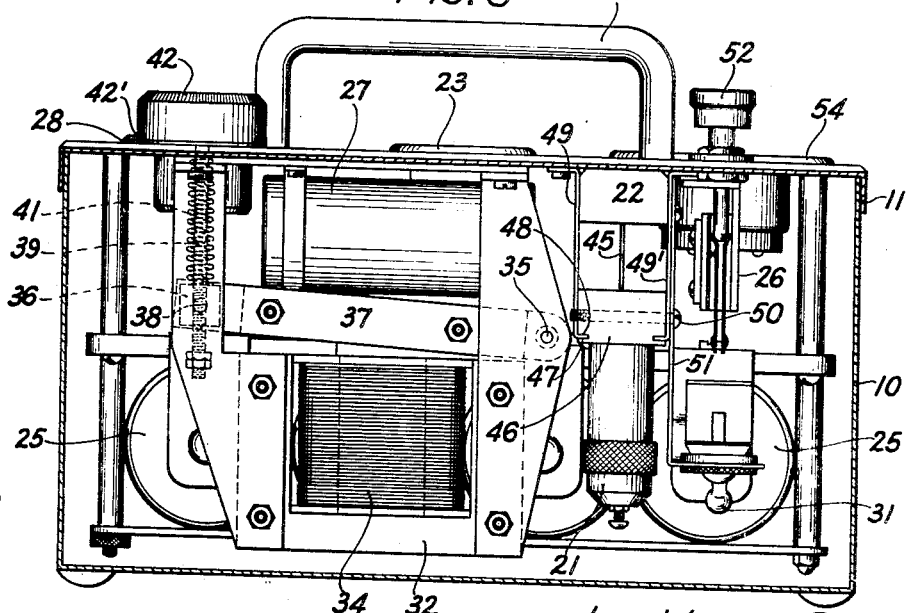

Patented July 13, 1943

2,324,075

UNITED STATES PATENT OFFICE 2,324,075

FLASHLIGHT SYNCHRONIZING APPARATUS

John Warren Gillon, Rochester, N. Y., and John C. Hollister, Denver, Colo., assignors of one-half to Eastman Kodak Company, Rochester, N. Y., a corporation of New Jersey, and one-half to Heiland Research Corporation, Denver, Colo., a corporation of Colorado Application January 31, 1941, Serial No. 376,844

6 Claims. (Cl. 240—2)

The present invention relates to flashlight photography, and particularly to a device for operating a flashlight and photographic shutter in timed relation so that the shutter will be wide open during the peak of illumination of the lamp.

As is well known to those skilled in the art, all known electrically ignited photographic flash lamps do not reach their peak of illumination the instant the lamp circuit is closed, but a short time after the closure of the lamp circuit. The interval of time between the ignition of the lamp and the time it reaches its peak of illumination is commonly known as the "lag" of the lamp, and varies with different types of electrically operated flash lamps.

It is also well known in the art that photographic shutters do not reach their wide open position immediately upon release, but a short time after such release. This time interval is commonly referred to as the shutter "lag," and since it depends upon the construction of the shutter operating mechanism, the "lag" of different types of shutters may, and generally do, vary over comparatively wide ranges.

Satisfactory instantaneous flashlight photography necessitates the shutter being wide open during the instant the lamp is at its peak of illumination, and particularly when high shutter speeds are being used in conjunction with a lamp which remains at peak intensity for a relatively short duration of time. To accomplish this result, flash synchronizers have been designed which are adapted to operate the shutter and close the lamp circuit in timed relation. However, the majority of these known synchronizers have been constructed so as to constitute a combined manually operated switch for the lamp circuit and operating means for the shutter. Since all well-known flash lamps heretofore generally used for photographic purposes possess a "lag" greater than the "lag" found in shutters previously used for flash photography, known flash synchronizers have had to be arranged so that the lamp circuit could be closed prior to the operation of the shutter. To vary the time of completion of the lamp circuit relative to the operation of the shutter, for synchronizing purposes, known flash synchronizing devices have usually been constructed so that one switch contact could be adjusted relative to the other. This allows the lamp circuit to be completed prior to the release of the shutter for insuring peak lamp illumination when the shutter is open.

It has been found that certain well-known types of vapor discharge lamps produce a flash of light of actinic intensity suitable for photographic purposes, and with which the instant of the flash can be governed very accurately. Vapor discharge lamps usually give a flash of very short duration, and have little or no "lag." By way of example, there is a well-known vapor discharge lamp, known as the Edgerton lamp, which will give a flash having an intensity whose photographic effect exceeds that obtained by using approximately 40,000 50-watt bulbs such as are used in household lighting. The flash of this particular lamp may have a duration from one to fifty microseconds depending upon its energizing circuit, and reaches its peak of illumination instantly upon completion of the igniting circuit thereof, or with a "lag" so small as to be of no consequence so far as synchronization of the same with a shutter is concerned.

All photographic shutters have a "lag" which will be exceedingly greater than any possible "lag," which might be found in a vapor discharge lamp of the type referred to. Therefore, all known synchronizing devices which are adapted to account for a lamp "lag" which is greater than the shutter "lag," and consequently close the lamp circuit prior to actuating the shutter, would not be adaptable to synchronizing to a shutter the flashing of a vapor discharge lamp of the type mentioned. In addition, since the duration of the flash in a vapor discharge lamp is so much shorter than the duration of a flash of any well-known electrically operated flash lamps now on the market, and regularly used by photographers, it will be readily understood that the problem of synchronizing the operation of a vapor discharge lamp with a shutter requires much more critical adjustment than is possible with well-known flash synchronizers.

Therefore, one object of the present invention is to provide a device for operating a photographic shutter and igniting an electrically ignited lamp having a "lag" different from the "lag" of the shutter, in timed relation so that said shutter will be wide open during the time the lamp is at it speak of illumination.

Another object is to provide a device of the type set forth which is adapted to operate electrically the shutter and close electrically the circuit of the lamp in timed relation so that said shutter will be wide open during the time the lamp is at its peak of illumination.

And another object is to provide a device of the type set forth in which the difference in "lags" of the shutter and lamp is accounted for by delaying the maximum flow of current to or through the electrically operated means for operating the member with the least "lag."

And a further object is to provide a device of the type described in which a reactance is used for delaying the maximum flow of current to one of said electrically operated means.

And yet another object is to provide a device of the type described in which the reactance is variable so that the device can be adjusted to account for the difference in "lags" characteristic of different lamp and shutter combinations.

And another object is to provide a device of the type set forth which is adapted to synchronize the operation of a shutter with a lamp having a "lag" greater than the "lag" of the shutter, or less than the "lag" of the shutter.

A further object is to provide a device of the type described comprising a shutter operating circuit including an electro-magnetic shutter tripper adapted to actuate the shutter, and a source of energy, two lamp operating circuits, one including a switch for closing a normally opened energizing circuit including a vapor discharge lamp, and a relay for operating said switch, and the second including an outlet into which an ordinary flash lamp may be plugged; and selective means for connecting either one of said lamp operating circuits in circuit with said source of energy; and means for simultaneously connecting the chosen lamp operating circuit and said shutter operating circuit with said source of energy.

Another object is to provide a device of the type set forth with a reactance so arranged that it can be connected in the lamp operating circuit or shutter operating circuit depending upon whether the lamp or shutter being used has the least "lag."

Another object is to so arrange said reactance that it is adapted to be automatically connected into either the shutter operating circuit or lamp operating circuit depending upon which lamp operating circuit is involved at the time the selected means is operated to connect one or the other of the lamp operating circuits in circuit with the source of energy.

The novel features that we consider characteristic of our invention are set forth with particularity in the appended claims. The invention itself, however, both as to its organization and its methods of operation, together with additional objects and advantages thereof, will best be understood from the following description of specific embodiments when read in connection with the accompanying drawings in which, Fig. 1 is an elevational view showing the timing device constructed in accordance with a preferred embodiment of the present invention, connected to a vapor discharge lamp and a shutter of a photographic camera for operating the two in synchronism, Fig. 2 is a wiring diagram of the timing device, and shown in operative association with a vapor discharge lamp of well-known form, Fig. 3 is a graph including a series of curves showing the flow characteristics of a current through a circuit including different values of reactances and showing superimposed on said curves two other curves indicating the opening characteristics of two different photographic shutters, Fig. 4 is a top plan view of the timing device, Fig. 5 is a sectional view taken through one end of the housing including the timing mechanism, and showing the arrangement of the mechanism in elevation, Fig. 6 is a sectional view taken through the end of the housing opposite to that shown in Fig. 5, Fig. 7 is a sectional view taken through one side of the housing, Fig. 8 is a sectional view taken through the opposite side of the housing, and Fig. 9 is a sectional view of a well known type of electromagnet adapted to be used as a shutter tripper and as a switch closing means with our timing device.

Like reference characters refer to corresponding parts throughout the drawings.

Generally speaking, the present invention relates to a timing device for synchronizing the operation of a photographic shutter having a given "lag" with the ignition of an electrically ignited flash lamp having no "lag," a "lag" less than the shutter "lag," or a "lag" greater than the shutter "lag." The shutter and lamp are adapted to be electrically operated and the difference between the "lags" of the shutter and lamp being used are accounted for by the introduction of a reactance into the operating circuit of the member having the least "lag," and for the purpose of delaying the flow of current through said member in accordance with the difference in the "lags" of the two.

Referring now to the drawings and particularly to Figs. 1–6, the timing device may comprise a portable housing 10 adapted to contain a part of an electrical operating circuit, hereinafter described, for operating a photographic shutter and igniting a flash lamp in timed relation, or in synchronism. The housing is closed by a removable cover 11 having a handle 12 thereon by means of which the housing as a whole may be readily carried about.

The device is adapted to synchronize the operation of a vapor discharge lamp with the operation of a photographic shutter, and as well known, such lamps require a high voltage for their operation and, therefore, include a special electrical ignition circuit for discharging the same. By way of example, in Figs. 1 and 2 we have shown our device in conjunction with a well-known type of mercury vapor discharge lamp, and commonly known as an Edgerton lamp. This Edgerton lamp and its electrical circuit per se form no part of the present invention, and is only shown to illustrate how our device is adapted to operate such a lamp and synchronize the flashing of such a lamp with the opening of a shutter, so that a complete showing and description of said lamp and its ignition circuit is not deemed necessary to a full understanding of the present invention. This particular vapor discharge lamp and its electrical ignition circuit is completely disclosed on page 194 of a book entitled, "Flash," by Edgerton and Killion, to which reference can be had for a complete disclosure of the same.

For the purpose of disclosing the present invention it will suffice to say that the Edgerton lamp shown comprises a vapor discharge lamp 13 through which a condenser 14 of high capacity is discharged to produce a flash when the gas in the lamp is ionized by the trigger circuit designated as 15 in the wiring diagram of Fig. 2. The lamp circuit also includes a transformer 16 and rectifier 16A to serve as a source of direct current, said transformer generally being connected to a 110-volt A. C. source of energy. The trigger circuit of the lamp is adapted to be closed by a flash trip switch 17, and upon closure of the same the lamp flashes instantly, or with so little "lag" that its operation can be considered instantaneous. The electrical circuit for the Edgerton lamp, which in Fig. 2 is shown in lighter lines than the circuit contained in the housing of our timing device to distinguish it therefrom, is generally contained in a casing 18 mounted on wheels for the sake of portability; and the lamp 13 is mounted in a reflector R supported above the casing by a tubular structure 19 through which the necessary wires to the lamp may pass, see Figs. 1 and 2. So as to be accessible, the flash trip switch 17 is generally mounted on the outside of the casing 18 but is preferably shunted to an electrical outlet, not shown, in the outside of the casing into which an extension cord 20 may be inserted so that the circuit can be closed by our timing device as hereinafter described.

The housing 10 of our device includes a normally open switch 22 electrically connected to an outlet 23 on the cover of the housing. The electrical extension 20 plugged into this outlet 23 and the outlet in the casing 18 of the Edgerton lamp shunted across the flash trip switch 17 will substitute the switch 22 in our device for the flash trip switch 17 so that closing the same will complete the trigger circuit of the Edgerton lamp and cause the lamp to flash. The switch 22 is adapted to be closed by a magnetic relay 21 located in the housing below said switch so that upon energization of this relay the switch will be closed.

The housing 10 also includes a source of energy which, in the illustrated embodiment, is shown as four dry cells 25 of 1½ volts each connected in series. This source of energy is adapted to be connected in circuit with the relay, as will be hereinafter set forth, to energize said relay when the normally open switch 26, in series with said source of energy, is closed. There may be a condenser 27 connected across the switch 26 to prevent arcing at the contacts of the same as the circuit is broken.

There is another electrical outlet 28 in the cover of the housing 10 that is permanently connected in series with said source of energy 25 in the housing. Into this outlet is adapted to be plugged an electrical extension 29 to the other end of which is connected a solenoid 30 for operating the release member of a photographic shutter. This shutter operating solenoid may be of any suitable construction, but should be such that it can be readily mounted on a camera in operative relation to the release member of a photographic shutter so that the movable member of the solenoid will operate the shutter release when the solenoid is energized.

There is a double throw toggle switch 31 mounted in the housing which in one of its positions, the dotted line position of Fig. 2, is adapted to connect the relay in circuit with the source of energy 25 and in parallel with a shutter operating circuit including the electrical outlet 28. When the toggle switch is in this position it will be readily understood that both the relay and solenoid will be simultaneously energized upon the switch 26 being closed, whereupon the solenoid and relay will be simultaneously operated, providing of course the two are so constructed as to operate at substantially the same time when energized with the same amount of current. The solenoid 30 and relay 21 may be, and preferably are, as shown, of the same construction so that they will have the same operating characteristics, the physical characteristics of the same being determined by the performance required thereof in operating the shutter release. Although the solenoid and relay may be identical in construction they have been referred to by different names to facilitate the description of the device and to avoid confusing one with the other. It is believed that the chosen designations are proper because an electro-magnetic means which operates a switch in an electrical circuit, or itself constitutes a switch, is generally referred to as a magnetic relay; while an electro-magnetic means which does mechanical work not connected with an electrical circuit is generally referred to as a solenoid.

It will be readily understood that if the shutter were operated simultaneously with the closing of the lamp circuit that the lamp would flash and be out before the shutter was fully opened, this being due to the fact that the fastest shutter has a "lag" after operation while a vapor discharge lamp of the type set forth has no "lag," or at least no "lag" which is material to the problem under consideration. Therefore, in order to synchronize such a shutter with a lamp of this type the operation of the relay must be retarded approximately 6 milli-seconds as compared to the time of operation of the solenoid.

We have found that this can be done effectively by introducing a reactance, e. g. an inductance or a capacitance network, in the circuit of the relay, which reactance will retard the rise of current in the circuit of the relay so that the operation of the relay will be delayed by an amount equal to the "lag" in the shutter, or by an amount equal to the difference between the "lag" in the shutter and the "lag" in the lamp, if the lamp used has a "lag." Thus, when the fastest shutter having a 6 milli-second "lag" is to be synchronized with a vapor discharge lamp of the type described, and having no "lag," the reactance in the circuit of the relay should be such as to retard the rise of current through the relay, after closure of the switch 26, and delay the operation of the relay for 6 milli-seconds. We are aware that a resistance when placed in a circuit containing a reactance retards the rise of current therethrough, but a resistance could not be used in this device in place of a reactance because a resistance acts to cut down the amount of current flowing in a circuit. In the present device the relay and solenoid are, and must be, constructed to operate with a given value of current and this current must be available for a satisfactory operation of the device. The reactance can be adjusted to give the desired time delay in the rise of current, in a circuit without affecting the maximum power in the circuit so that it is particularly adapted for use in this device.

In the housing 10 of our device, therefore, we place a reactance which is adapted to be automatically connected into the circuit of the relay 21 when the toggle switch 31 is thrown to the position for connecting the relay in circuit with the source of energy, see dotted line position in Fig. 2. As shown in the drawings, and particularly Figs. 2, 5-8, this reactance is preferably an inductance L which may comprise a shell type laminated iron core 32 having a variable air gap adjusted by a movable laminated pole piece, or armature 33, extending across the top of the core. A coil 34 of many turns of wire is wound around the center leg of the iron core and the current is made to flow through this coil. When a current flows through coil 34 a magnetic flux is set up in the iron core and associated movable pole piece 33, which flux during its rise produces a counter voltage which opposes the applied voltage, and delays, the rise of current through the coil and to the circuit beyond the coil as is well known to those skilled in the art. For reasons which will be clearly set out hereinafter, it is desirable that the inductance be variable. To this end the pole piece 33 is pivoted at one end to a stud 35 so that it can be moved to and from contact with the tops of the three legs of the core 32 to produce an air gap between the movable pole piece and the three legs. As the air gap in the inductance is changed, the value of the inductance is varied and this fact is utilized in varying the delay in the current rise of the circuit including the inductance to account for the difference in the "lag" characteristics of a given shutter and lamp which it is desired to synchronize.

For the purpose of adjusting the pole piece 33 to vary the air gap of the inductance, the following structure is provided. Referring to Figs. 6 and 8, a block 36 extends between two arms 37 connected to opposite sides of the pole piece 33 and extending beyond the free end thereof, and is pivoted to each of said bars by having a pin 38 on opposite ends thereof engaging holes in the bars. A threaded rod 39 extending vertically downward from the under side of the cover passes through a threaded bore in the block 36 and has an adjusting knob 40 non-rotatably connected to its end extending to the outside of the cover. Thus, when the knob 40 is rotated the rod 39 is in turn rotated and the pole piece 33 moves toward or away from the top of the iron core 32 depending upon the direction of rotation of said knob. A heavy compression spring 41 surrounding the rod 39 and located between the top of the pole piece and the under side of the cover reduces the force necessary to close the air gap when the knob 40 is turned clockwise and takes up any backlash in the threaded engagement between the rod 39 and the block 36 so as to provide for a smooth accurate adjustment of the pole piece 33. A protecting cap 42 may be threaded onto a threaded flange 42' on the cover and surrounding the knob 40 so as to protect the knob against accidental movement from a given adjusted position.

If the timing device were to be used to synchronize only one shutter having a given "lag" with a lamp having a given "lag," or no "lag," then a non-adjustable reactance suitably constructed to account for the difference in the "lags" of the two would be sufficient. However, in order to be practical a device of this type should be capable of synchronizing a number of different shutters with a given lamp or with different lamps, and in which the "lag" differences to be accounted for might vary over a comparatively wide range. To meet these conditions, therefore, the inductance L should be variable as is the one set forth. For instance, there are a number of shutters used by photographers the "lag" values of which vary from 6 milli-seconds to 45 milli-seconds. In order to adapt this device to synchronize any one of these shutters with a lamp having no "lag" it will be appreciated that the inductance must be constructed to give delays in the rise of current to the relay from a minimum of 6 milli-seconds to a maximum of 45 milli-seconds. In the disclosed arrangement, therefore, the inductance is constructed so that when the pole piece 33 is lowered to the top of the core 32 the current flowing therethrough will be delayed slightly more than 45 milli-seconds, and when the pole piece 33 is raised to its uppermost position to give the maximum air gap the current flowing therethrough will be delayed slightly less than 6 milli-seconds. Adjustment of the pole piece 33 to points between its two extreme positions will give an infinite number of different inductive characteristics so that the delay in the current flow to account for the "lag" of any shutter within a range of 6 to 45 milli-seconds can be accounted for.

Referring to Fig. 3, the characteristics of a current flow through a circuit including different values of inductances are shown by the full line curves the ordinate of which is current, designated as I, and the abscissa of which is time, designated as $t$. When a circuit including a given source of energy is closed the current will gradually build up in the circuit until it reaches its full value. The greater the inductance in the given circuit the more gradual will be the increase in current in reacting its maximum value, as evidenced by the curves moving to the right over the time scale.

Superposed on the characteristic current curves of Fig. 3, we have indicated the opening characteristics of two different photographic shutters in order to show how the delay of current in a circuit is utilized to account for shutter "lag," and how the range of the disclosed variable inductance is determined. The shutter opening curves, dotted line curves, are plotted on the same time scale as the current flow curves, but the ordinate represents degree of shutter opening rather than current. The small curve to the left represents the fastest shutter available set to operate at a fast speed, $\frac{1}{400}$ of a second. Considering the intersection of the ordinate and abscissa the point where the shutter is operated, as well as where the circuit including the inductance was completed, it will be noticed that there is a lag before the shutter even starts to open, approximately 4 milli-seconds, then the shutter takes time to reach its full open position, approximately 2 milli-seconds, stays open a given time depending upon its speed setting, 2½ milli-seconds if set at $\frac{1}{400}$ of a second, and then closes.

Referring to the other shutter curve, which is characteristic of the slowest shutter which might be used, we see that this shutter takes longer to actually start to open after release, then gradually reaches its full open position which it maintains for 20 milli-seconds, since $\frac{1}{50}$ of a second is its fastest shutter speed, then closes. The actual "lag" of this shutter has been found to be 21 milli-seconds, it stays open for 20 milli-seconds, and takes approximately 10 milli-seconds to completely close. All other shutters which one might desire to use for flash photography will have "lag" and operating characteristics which will bring them between the two extremes shown, so that if the variable inductance is constructed to include these two extreme ranges it can be adjusted to accommodate the "lag" of, and synchronize the flashing of a lamp with, any shutter which might come between the two, as illustrated.

Instead of using the full value of current of the source of energy to operate relay 21, a value $I_1$ is chosen. This value $I_1$ is chosen first because it is the highest value of current reached in a suitable time before the fastest shutter starts to open, as evidenced by the vertical line X on the curve, and because it gives a range of delay adjustments great enough to include the slowest shutter, as evidenced by the vertical line Y. The inductance is constructed, therefore, in a manner so that when the pole piece or armature 33 is down on top of the iron core 32 and there is no air gap the current flowing therethrough will have the characteristics of curve 8; and with the bar adjusted to give the greatest air gap the current will have the characteristics of curve 1. With the fastest shutter in use the inductance should be varied to give the current-time curve 2, while with the slowest shutter in use the inductance should be adjusted to give the current-time curve 7.

The current value $I_1$ is conveniently chosen by adjusting the relay 21 longitudinally of the arm of switch 22 and relative to the pivot point of said arm to change the mechanical advantage of operation of the plunger 45 of the relay on the switch arm, see Figs. 2 and 8. For this purpose the relay 21 is mounted on a block 46 having ways 47 in its opposite edges into which the turned in ends 48 of supporting straps 49 and 49' fixed to the under side of the cover extend to slidably mount the relay below the switch 22, see Figs. 5 and 8. The block 46 can be locked in any desired position of adjustment by tightening a screw 50 which is threaded into strap 49 and extends from strap 49' and toggle switch bracket 51 to strap 49 through a longitudinal slot in block 46. It seems hardly necessary to point out that the switch 22 has a pivoted operating arm on which the plunger of the relay operates and is normally supported by, and that by adjusting the relay so that the plunger operates at different distances from the pivot point of the switch arm the operating force necessary to close the switch can be varied, and in turn the amount of current through the relay to effect this force magnetically can be conveniently altered.

From the above description, it will be readily appreciated that the following steps are required to synchronize properly the operation of any shutter with the flashing of a vapor discharge lamp. The lamp and its energizing circuit is connected into the housing 10 by the electrical extension 20, and the solenoid 30 is connected into the housing by the electrical extension 29. Then the toggle switch 31 is thrown to the dotted line position to connect the inductance L in circuit with the magnetic relay 21 and said inductance is adjusted to give a delay in the flow of current to the relay equal to the "lag" in the particular shutter being used. The knob 40 could be calibrated to facilitate the adjustment of the inductance to give the desired delays in the rise of current flow, but since the shutter "lag" may vary slightly from average values it is preferable to finally adjust the inductance by operating the device, using any well-known oscillographic testing machine for this purpose, or simply holding the shutter before the lamp and observing if the light is visible through the shutter when the device is operated. After the inductance has been satisfactorily adjusted then film can be placed in the camera and pictures can be taken by closing the switch 26 by means of a button 52 located directly on the outside of the housing, or by means of an extension switch 53 plugged into an outlet 54 on the cover 11, which outlet is connected across the switch 26.

It is possible that flashlight pictures might be desired where the current necessary to operate vapor discharge lamps is not available. In this event an ordinary electrically ignited flash lamp would have to be resorted to and would have to be synchronized with the camera shutter. We have, therefore, adapted this device to synchronize ordinary flash lamps with photographic shutters. It is to be remembered that ordinary flash lamps have a "lag" of about 20 milli-seconds which is greater than the "lag" found in photographic shutters, with the exception of the slowest which has a 21 milli-second "lag," but which latter shutter is rarely used for making instantaneous exposures except with a portrait camera. It will be appreciated, therefore, that with high speed shutters the operation of the shutter must be delayed relative to the ignition of the lamp to effect proper synchronization.

To meet these conditions our device is constructed so that by throwing the toggle switch 31 to its other position, or full line position, see Fig. 2, the inductance is placed in circuit with the solenoid 30 to delay the flow of current thereto. An ordinary flash lamp can be discharged with a relatively low value of voltage and for this reason can, if desired, be flashed by the dry cells 25 in the housing 10. So that the flash lamp can be connected in circuit with the dry cells 25, one side of the outlet 23 may be connected directly to one side of the dry cells by a line 57 and the other side of the outlet may be connected to a terminal 58. The lamp in a suitable socket may be plugged into the outlet 23. By throwing the toggle switch 31 to the full line position shown in Fig. 2 the inductance L is connected in series with the solenoid, the outlet 23 is connected across the dry cells 25 and in parallel with the solenoid 30 and the inductance, and the relay 21 is disconnected from the dry cells. Then by closing the switch 26 the solenoid circuit and the flash lamp circuit are simultaneously connected to the dry cells, and the rise of current through the solenoid is delayed by an amount equal to the difference in the "lags" of the shutter and lamp to effect synchronization.

We have found that if an inductance adjusted to give proper synchronization of any shutter, except the slowest one mentioned, and vapor discharge lamp is swung to the solenoid circuit it will properly synchronize the same shutter with an ordinary flash lamp connected in circuit with the dry cells as just explained.

This is explained by the fact that the inductance will retard the rise of current in the solenoid just as it retarded the rise of the current in the relay, and will consequently delay the operation of the solenoid, and hence the opening of the shutter, until the flash lamp which is directly connected with the dry cells 25 has ignited and reached its peak of illumination. In actual operation the solenoid is adjusted so that the shutter will open about 10 milli-seconds after the solenoid circuit has been closed. To synchronize the vapor lamp, the inductance is adjusted to operate the relay at about 11 milli-seconds after closure of the circuit. When transferred into the solenoid circuit, the inductance produces the same delay in operation, or 11 milli-seconds, which added to the delay of 10 milli-seconds produces a total delay of about 21 milli-seconds which is substantially the delay of an ordinary flash lamp. It might be pointed out that this phenomenon does not hold true when the slowest shutter mentioned, having an actual lag of approximately 21 milli-seconds, is being used, but this is of no consequence since it is not desirable to use ordinary flash lamps with this type of shutter anyway. This phenomenon makes it possible to rapidly switch from the use of a vapor discharge lamp to the use of an ordinary flash lamp without necessitating an adjustment of the inductance for synchronizing purposes.

It will be readily understood that instead of using the same outlet 23 for an ordinary flash lamp bulb and vapor discharge lamp, that a separate outlet for the flash lamp connected in circuit with the dry cells and toggle switch in the manner set forth could be provided in the cover 11 of the housing 10. Or, if the flash lamp was provided with its own energizing circuit it could be plugged into the outlet 23 so that the switch 22 would close the energizing circuit, and the relay 21 could be used in the same manner as set forth in connection with the vapor discharge lamp. However, due to the fact that the flash lamp has a "lag" greater than most shutters the inductance has to be switched from the relay circuit to the solenoid circuit by the toggle switch to account for the relation of the "lag" of the two members.

While it is preferable to operate the shutter electrically by means of a solenoid as set forth, it is pointed out that the timing device constituting the present invention is not necessarily limited to such an arrangement. For instance, it will be readily appreciated by those skilled in the art that the shutter could be operated by a manually operated plunger, instead of the solenoid 30, the operation of which could close the equivalent of switch 26 the instant the shutter was operated by the plunger. As an example of a suitable manually operated synchronizing device which could be used in this capacity reference is made to the synchronizing device disclosed in U. S. Patent 2,279,370, issued April 14, 1942, in the name of John Warren Gillon. This referred to synchronizing device could be screwed into the cable release socket 79 of the shutter to operate the shutter release member 81 in the same manner as the solenoid 30 shown, and the electrical jacks thereof could be connected across the switch 26 so that the switch of the device would supplement switch 26 and be closed the instant the shutter was operated by a manual operation thereof. The result would be the same as if the shutter were tripped electrically with the control circuit of the present timing device herein disclosed, namely that the circuit including the relay 21 would be energized the instant that the shutter was operated as is done when the shutter is operated by a solenoid. It seems hardly necessary to point out that the use of a manually operated shutter release and switch closing device would be limited to use under conditions where the flash lamp had a "lag" less than the "lag" of the shutter, in which case the reactance L would appear in the energizing circuit of the relay 21. If an ordinary flash lamp having a "lag" greater than that found in the most shutters used for flash photography were to be synchronized with the shutter then the operation of the shutter would have to be delayed relative to the operation of the lamp and the shutter would have to be operated electrically so that the reactance could be inserted into its energizing circuit to provide the desired delay of operation thereof as previously set forth.

Referring now to Fig. 9, a well-known type of solenoid suitable for use as a shutter tripper and relay in connection with our timing device set forth above will be described. This solenoid comprises an annular magnetic coil 60 encased in a shell 61 from the side of which projects two electrical jacks 62 electrically connected to the coil and onto which a conventional electrical extension may be placed to connect the coil to a source of energy such as the dry cell 25 mentioned in connection with our device. The jacks 62 are directly carried by an insulating block 63, but this block is in turn connected to and supported by a ring of metal 64 partially surrounding the coil.

The top of the coil is covered by a metal ring 65 and the interior of the coil is lined with a metal sleeve 66 turned over at the top to hold the ring 65 in place and form a stop for the plunger of the solenoid as hereinafter set forth. Slidably mounted within the sleeve 66 is a plunger 67 having an enlarged top 68 which comes against the turned over edge of the sleeve 66 to limit the movement of the plunger in one direction. The lower end 69 of the plunger is tapered as shown to correspond with the tapered end 70 of the metal plug 71 extending into the lower end of the coil and fastened in place by screws 72. The corresponding tapered portions of the plunger and plug provide a stronger magnetic pull between the plug and the plunger, and are not designed so as to provide a stop for the plunger.

The plunger carries a rod 73 which extends through a bore in the plunger and is movable relative thereto. The upper end 74 of the rod 73 is threaded to engage a tapped portion of the bore in the plunger, and extends through the top of the plunger, and carries a lock nut 75. This rod also slidably extends through the metal plug 71 and an attaching sleeve 76 rotatably mounted on the projection 77 of the plug, the lower end of said attaching sleeve including a threaded portion 78 adapted to be screwed into the cable release socket 79 found on most between-the-lens types of shutters, e. g. 80, on the market.

When the solenoid is mounted on the shutter casing by screwing the attaching sleeve 76 into the cable release socket the rod 73, carried by the plunger, is in a position to engage the release member 81 of the shutter. In fact, the rod 73 and plunger 67 are normally supported in the raised position shown in Fig. 9 by the shutter release member which is normally spring pressed clockwise of the pivot point 82 by a spring, not shown. The shutter is released when the release member 81 is moved counterclockwise from the position shown in Fig. 9 and which movement is adapted to be effected by the rod 73 when the plunger is pulled downwardly by the coil upon being energized. After the plunger is pulled downwardly by the coil to actuate the shutter it is again returned to the position shown by the spring of the shutter acting on the release member 81 so that no cocking of the solenoid is required.

Since the throw of the release member 81 necessary to release the shutter may vary to some extent in different shutters the movement of the plunger 67 and the rod 73 must be adjusted to the particular shutter with which the solenoid is to be used. This is done by loosening the lock nut 75 and turning the plunger relative to the rod until the shutter just trips when the head 68 of the plunger 67 comes to a stop against the turned-over edge of the sleeve 66. In order to insure the arrival of the plunger 67 at its lowermost position at a given time after energization of the circuit by a given current, means must be provided to limit the uppermost position of the plunger. To this end, the cap 82 is screwed onto the top of the plunger and carries an adjusting screw 83 which is adapted to be engaged by the end of the rod 73. After the effective length of the rod 73 has been adjusted, as above set forth, the screw 83 is turned down until the shutter just trips when the coil is energized by the source of energy with which it is to be used. This adjusting screw 83 is locked in its adjusted position by tightening down the lock nut 84 carried thereby. The attaching sleeve 76 is rotatably connected to the projection 77 of the plug 71 by a set screw 85 extending therethrough and into a circumferential groove 86 in said projection. By loosening the set screw 85 the solenoid as a whole can be rotated relative to the attaching sleeve 76 to place the jacks 62 in a convenient location after which the screw is retightened.

From the above description it will be readily appreciated that we have provided a device for synchronizing the flashing of an electrically operated lamp with the operation of a photographic shutter regardless of whether the shutter "lag" is greater than, or less than, the "lag," if any, characteristic of the lamp with which it is to be synchronized. The device is readily adjusted so that any number of shutters having "lags" varying over a wide range may be synchronized with any one type of flash lamp. The device makes use of an electro-magnetic shutter tripper one type of which is adapted for use with all but certain shutters.

Although we have shown and described certain specific embodiments of our invention we are fully aware that many modifications thereof are possible. Our invention, therefore, is not to be restricted except insofar as is necessitated by the scope of the appended claims.

Having thus described our invention, what we claim is new and desire to secure by Letters Patent of the United States is:

1. A device of the type described for operating a photographic shutter and igniting an electrically ignited flash lamp in timed relation, comprising, in combination, a shutter operating circuit, a lamp operating circuit, a source of electrical energy, a single means for connecting both of said circuits to said source, a reactance, and means for selectively associating said reactance with either of said circuits for the sole purpose of delaying the flow of current therein, whereby a time differential is introduced between the operation of said shutter and said lamp.

2. A device of the type described for operating a photographic shutter and igniting an electrically ignited flash lamp in timed relation, comprising a housing, an electrical outlet in said housing into which an open energizing circuit of a flash lamp is adapted to be plugged, a normally open switch in said housing for short circuiting said outlet to complete the lamp circuit plugged thereinto, a magnetic relay for closing said switch when energized, an electrical outlet in said housing into which a solenoid for operating a shutter is adapted to be plugged, a source of energy in said housing, means for simultaneously connecting said source of energy with said relay and with the outlet into which said solenoid is adapted to be plugged, and a reactance in said housing in circuit with said relay for delaying the flow of current to said relay whereby a time differential is introduced between the operation of said shutter and said lamp.

3. A device of the type described for operating a photographic shutter and igniting an electrically ignited flash lamp in timed relation, comprising a housing, an electrical outlet in said housing into which an open energizing circuit of a flash lamp is adapted to be plugged, a normally open switch in said housing for short circuiting said outlet to complete the lamp circuit plugged thereinto, a magnetic relay for closing said switch when energized, an electrical outlet in said housing into which a solenoid for operating a shutter is adapted to be plugged, a source of energy in said housing, means for simultaneously connecting said source of energy with said relay and with the outlet into which said solenoid is adapted to be plugged, and a reactance in said housing in circuit with said relay for delaying the flow of current to said relay whereby a time differential is introduced between the operation of said shutter and said lamp, and means for adjusting the characteristic of said reactance to vary the time of delay in the flow of current in accordance with the operating characteristics of different shutters and different lamps.

4. A device of the type described for operating a photographic shutter and igniting an electrically ignited flash lamp in timed relation, comprising a housing, an electrical outlet in said housing into which an open energizing circuit of a flash lamp is adapted to be plugged, a normally open switch in said housing for short circuiting said outlet to complete the lamp circuit plugged thereinto, a magnetic relay for closing said switch when energized, an electrical outlet in said housing into which a solenoid for operating a shutter is adapted to be plugged, a source of energy in said housing, means for simultaneously connecting said source of energy with said relay and with the outlet into which said solenoid is adapted to be plugged, and a reactance in said housing in circuit with said outlet into which said solenoid is adapted to be plugged for delaying the flow of current to said solenoid, whereby a time differential is introduced between the operation of said shutter and said lamp.

5. A device of the type described for operating a photographic shutter and igniting an electrically ignited flash lamp in timed relation, comprising a housing, an electrical outlet in said housing into which an open energizing circuit of a flash lamp is adapted to be plugged, an electrical outlet in said housing into which a lamp having no energizing circuit is adapted to be plugged, a normally open switch in said housing for short circuiting said first mentioned outlet to complete the lamp circuit plugged thereinto, a magnetic relay for closing the switch when energized, an electrical outlet in said housing into which a solenoid for operating a shutter is adapted to be plugged, a source of energy in said housing, a reactance in said housing, means for selectively placing either said second mentioned lamp outlet or said magnetic relay in circuit with said source of energy, means for simultaneously connecting said source of energy with said outlet adapted to receive said solenoid and either said magnetic relay or second mentioned lamp outlet depending upon the position of said selectively operated means, and means for selectively connecting said reactance in circuit with said relay, when the latter is connected in circuit with said source of energy, or in circuit with said solenoid outlet, when said second mentioned lamp outlet is connected in circuit with said source of energy, whereby a time differential is introduced between the operation of said shutter and lamp in accordance with the operating characteristics of the two.

6. A device of the type described for operating a photographic shutter and igniting an electrically ignited flash lamp in timed relation, comprising a housing, a shutter operating circuit in said housing including an electrical outlet into which a solenoid for operating a shutter is adapted to be plugged, and a source of energy, a lamp operating circuit connected in parallel with said shutter operating circuit and including said source of energy, an electrical outlet in said housing into which an open energizing circuit of a flash lamp is adapted to be plugged, a normally open switch in said housing for short circuiting said outlet to complete the lamp circuit plugged thereinto, a magnetic relay for closing said switch when energized, an electrical outlet in said housing into which a lamp having no energizing circuit is adapted to be plugged, a reactance in said housing, a double-throw switch adapted in one position to connect said relay and reactance in said lamp operating circuit, and adapted in its second position to connect said second mentioned lamp outlet in the lamp operating circuit and said reactance in the shutter operating circuit, and means for simultaneously connecting said source of energy with said shutter operating circuit and lamp operating circuit.

JOHN WARREN GILLON.
JOHN C. HOLLISTER.